United States Patent [19]

Harper et al.

[11] 3,994,420
[45] Nov. 30, 1976

[54] TABLET DISPENSING MECHANISM

[75] Inventors: Bruce M. Harper, San Jose; Ronald J. Billett, Sunnyvale, both of Calif.

[73] Assignee: FMC Corporation, San Jose, Calif.

[22] Filed: Jan. 6, 1975

[21] Appl. No.: 538,986

[52] U.S. Cl. .............................. 222/57; 222/190; 221/13; 221/272; 210/169; 23/267 A; 23/272.7
[51] Int. Cl.² .................... B67D 5/58; B01D 11/00
[58] Field of Search ............ 221/1, 9, 13, 135, 151, 221/258, 263, 264, 15, 206, 207, 268, 272; 222/52, 59, 57, 190; 210/169; 23/272.7, 272.8, 267 A, 267 B, 267 D, 267 E, 267 F, 267 R

[56] References Cited
UNITED STATES PATENTS

| | | | |
|---|---|---|---|
| 2,542,431 | 2/1951 | Rice | 23/267 A X |
| 3,549,048 | 12/1970 | Goodman | 222/57 |
| 3,785,525 | 1/1974 | Handeland | 221/15 X |
| 3,860,394 | 1/1975 | Tepas et al. | 23/267 E |
| 3,918,607 | 11/1975 | Rowlette | 221/15 |

Primary Examiner—Robert B. Reeves
Assistant Examiner—Joseph J. Rolla
Attorney, Agent, or Firm—R. S. Kelly; C. E. Tripp

[57] ABSTRACT

A vertical stack of tablets is disposed in a tubular container extending upwardly from an opening in the top wall of a housing. The tablets are dropped one-by-one in front of a reciprocable pusher, which is driven by a rotary impeller and is effective to eject the lowermost tablet out from under the stack and into a sump in the housing, where it may be dissolved by water in the sump. The impeller is driven by a jet of water from a nozzle which receives water under pressure from a conduit leading into the housing. Water under pressure from this same conduit operates a settable ratchet device and a jet-deflector so that, when the desired number of tablets have been dispensed, the jet is deflected and the impeller is stopped to stop the reciprocation of the tablet-dispensing pusher.

15 Claims, 12 Drawing Figures

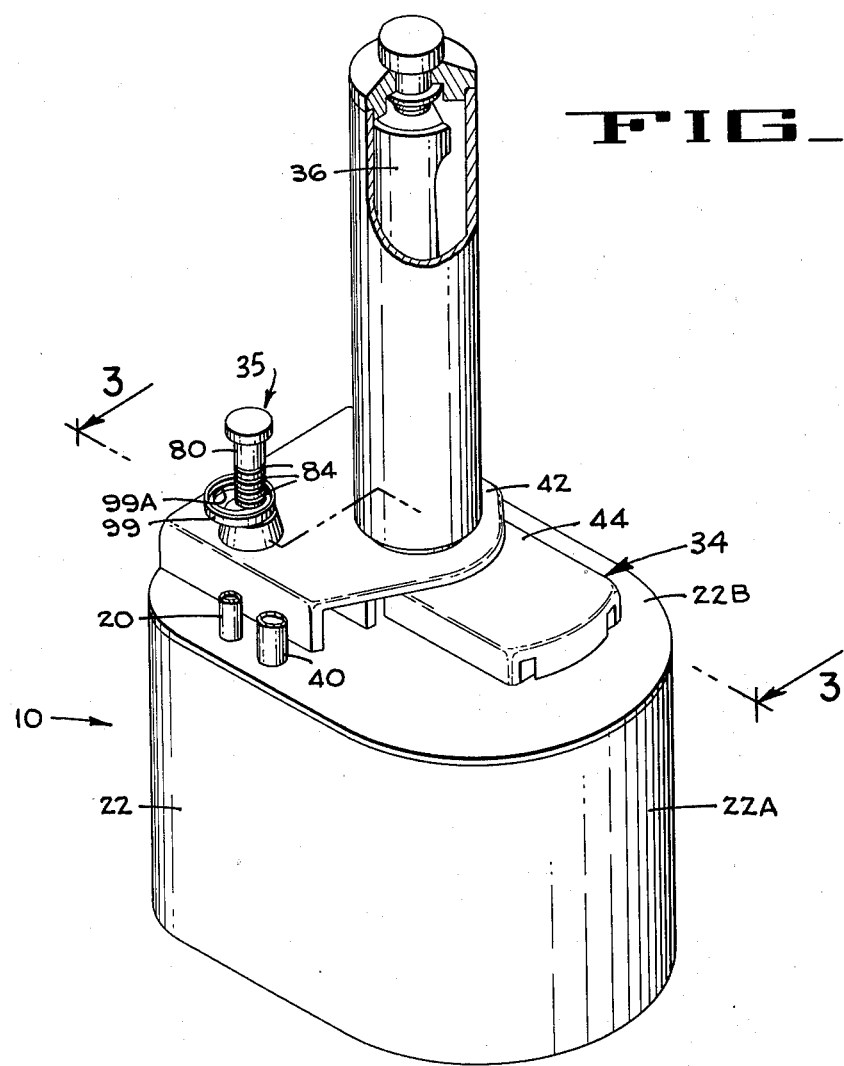
FIG_2
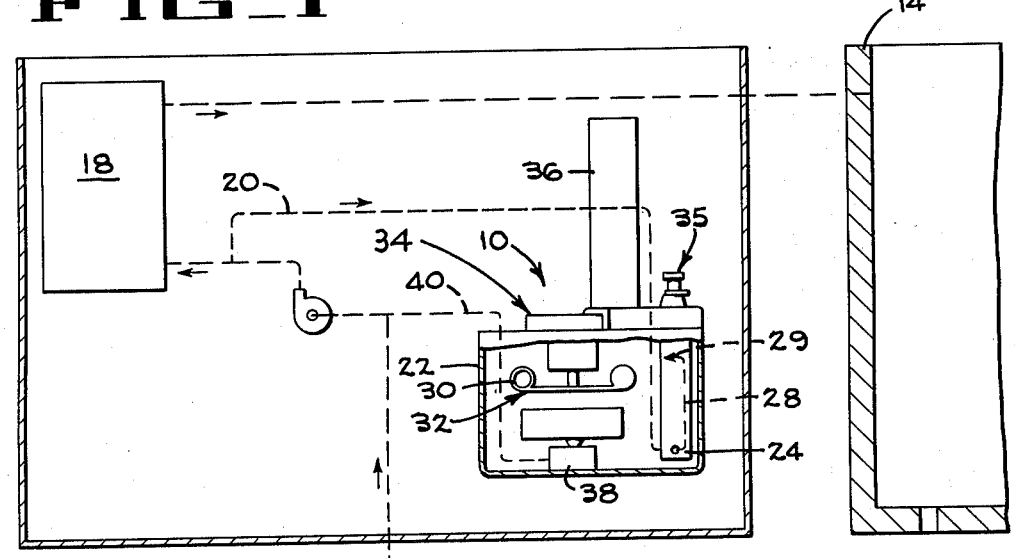
FIG_1

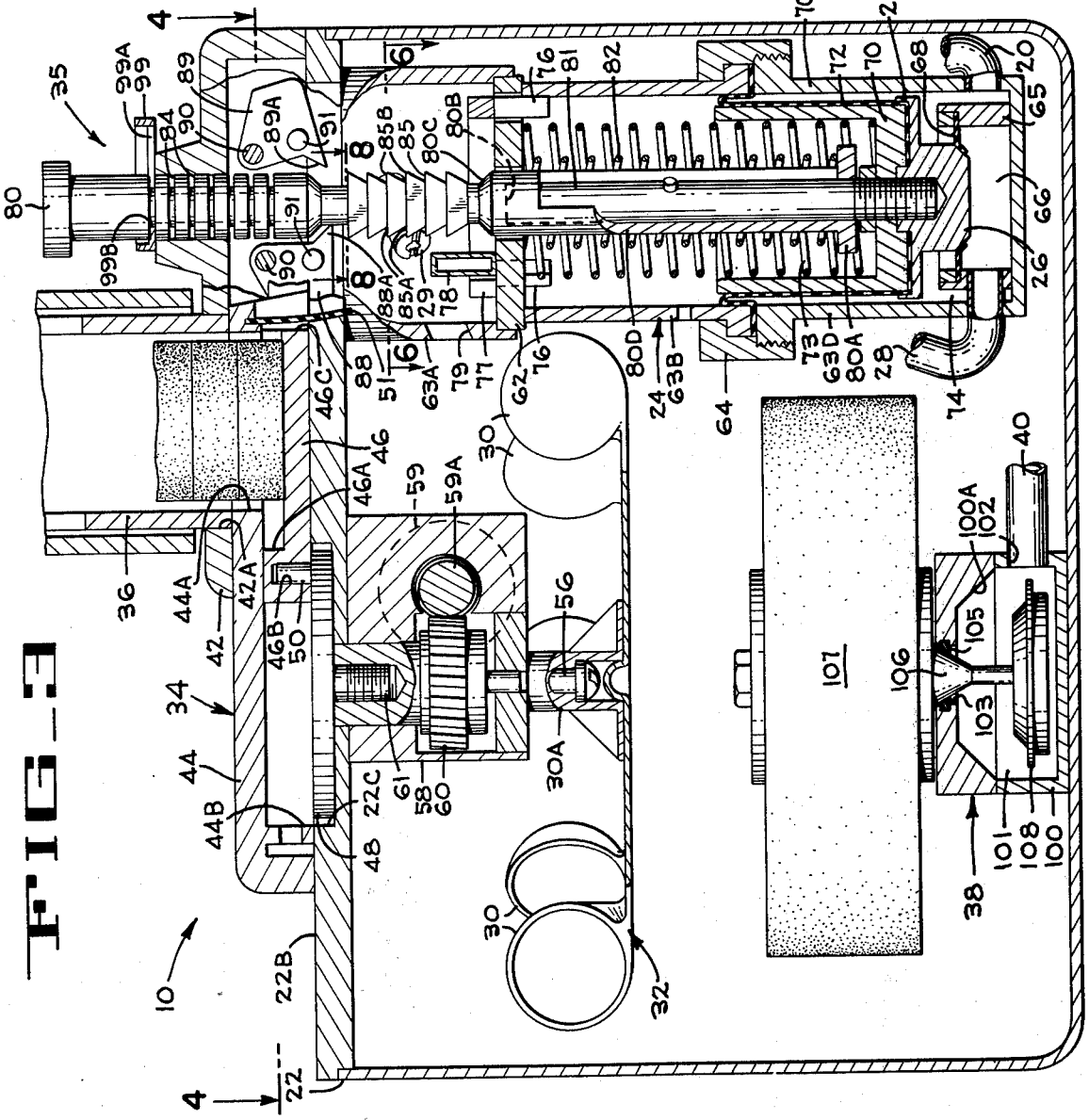

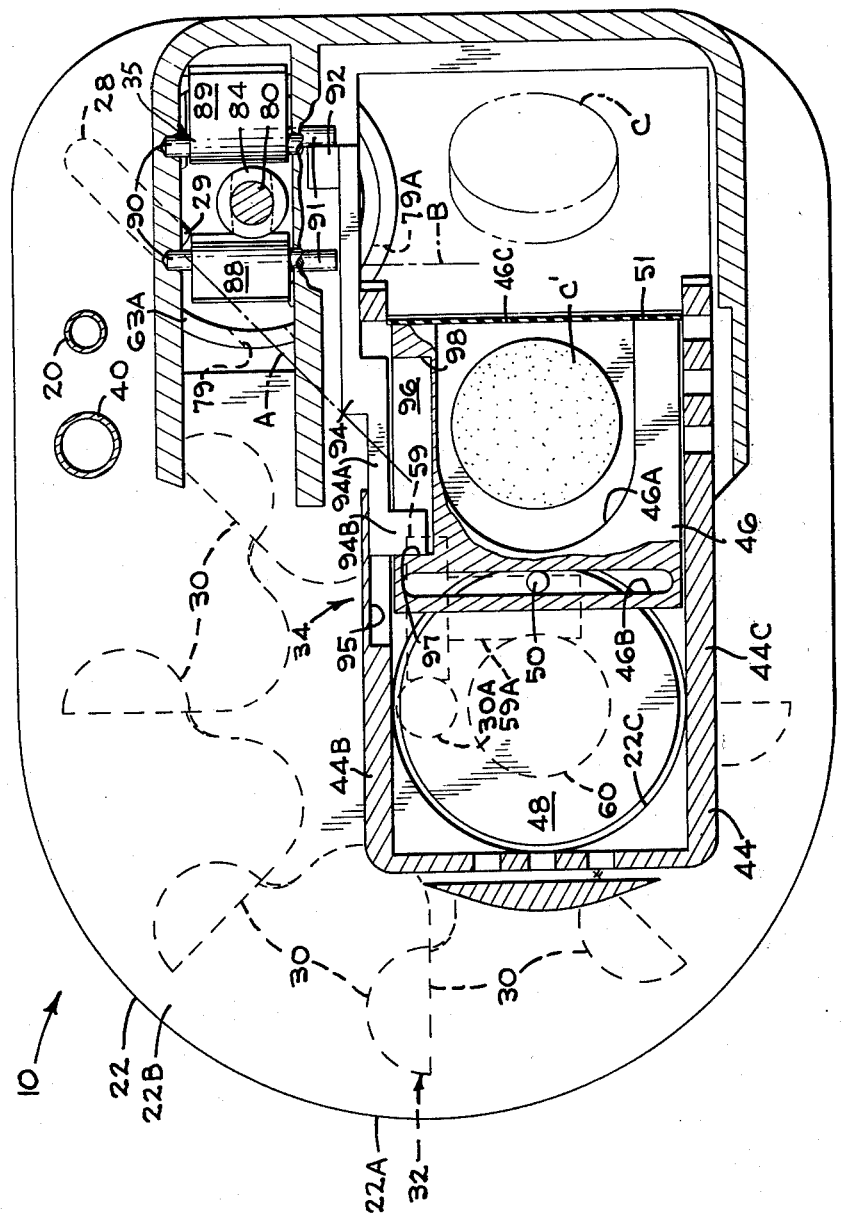
FIG_4

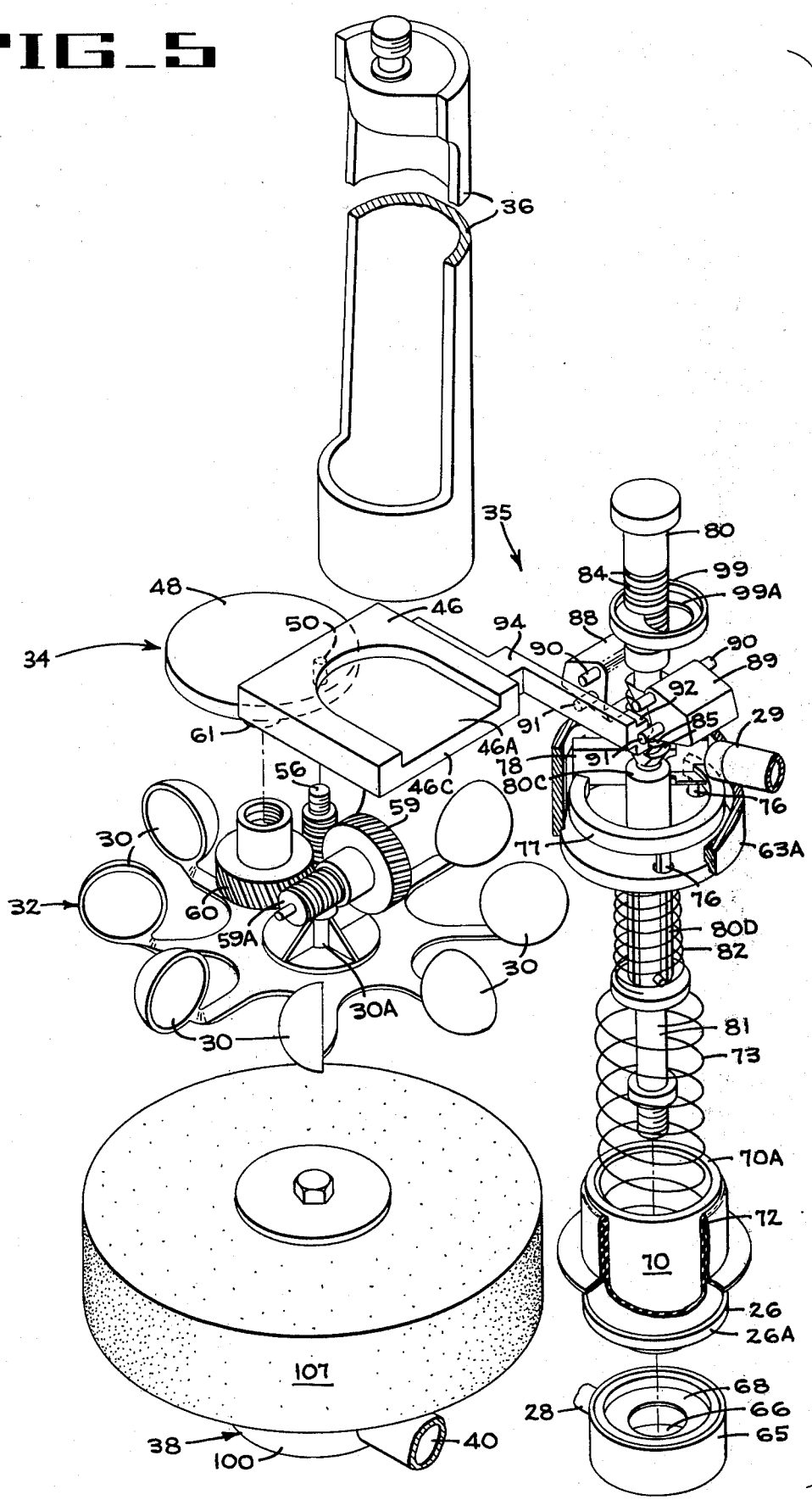
FIG_5

TABLET DISPENSING MECHANISM

BACKGROUND OF THE INVENTION

1. Field of the Invention

The present invention pertains to a mechanism for dispensing articles such as tablets and, more particularly, it relates to a dispensing mechanism having means whereby the mechanism can be programmed to dispense a predetermined number of tablets each cycle of operation, whereby the cycle may be automatically repeated, and whereby the control mechanism may be changed to vary the number of tablets dispensed per cycle.

2. Description of the Prior Art

To provide continuous disinfection and algae control in a swimming pool, it is desirable that a predetermined amount of chemical be added to the pool at predetermined intervals. Also, since the chemicals usually employed are harmful to the skin and other members of the body, it is desirable that contact with the chemicals be minimized. Further, to eliminate reliance on the regular servicing of the pool by an attendant, it is desirable that the periodic treatment of the water in the pool be carried out automatically.

Various devices are now being used for automatically distributing chemicals, primarily chlorine, into a swimming pool, by discharging the chemical material in a powdered form, and it has been found that, in this form, the material because of its hygroscopic nature may cause clogs and obstructions in the distributing system. To avoid clogging some devices have been proposed for dispensing the chemicals in a solid, stick or tablet form, however, such dispensers are not generally automatic in operation and their effectiveness is often dependent upon actuation by an attendant. In addition the dissolution rate and quality of these solid chemical forms is inconsistent due to fluctuations of water pressure or temperature or flow rate within the dispensing device or density variations of the solid chemical product.

The present invention provides a device that is capable of dispensing chemicals in solid, tableted nonclogging, rapid dissolving form, and is also capable of dispensing the capsules automatically.

A feature of the invention is the provision of a means for programming the dispensing of tablets whereby a charge containing a predetermined number of tablets may be dispensed automatically at each operation of the device; the number can be varied; and, further, all tablets of the charge may be of a single type, such as a disinfectant, or they may be of several types including, for example, a chemical for treating the PH or the hardness characteristic of the water.

A further feature is the provision of a dispenser that is independent of fluctuations in the pressure or temperature of the water in the system.

A still further feature of the present invention is the provision of a dispenser that can effectively handle tablets that are designed to dissolve rapidly, and that accomplishes this dissolution in a chamber separate from the pool so that users are prevented from coming into contact with the high strength chemicals.

Lastly, the dispenser is so equipped that it may be installed in the plumbing circuit either above or below the pool surface and yet not drain the pool or the pump cavity, should power to the system be interrupted.

SUMMARY OF THE INVENTION

The tablet dispensing machine comprises a container for retaining a quantity of tablets, a mechanism for removing each tablet from the container and directing it into a reservoir of liquid in which it is dissolved, and programming means whereby a predetermined number of tablets can be dispensed from the container during each cycle of operation and whereby the cycle can be automatically repeated. The dispensing mechanism features an impeller that is driven by the pressure of liquid in the system being treated by means of the tablets, and the programming means includes a ratcheting mechanism that is under the joint control of the liquid pressure in the system and the operation of the tablet dispensing mechanism.

DESCRIPTION OF THE DRAWINGS

FIG. 1 is a schematic diagram of a system, according to the teachings of the present invention, for treating liquid in a swimming pool.

FIG. 2 is an isometric of the portion of the system of FIG. 1 that includes the tablet dispensing mechanism of the present invention.

FIG. 3 is an enlarged vertical section taken along lines 3—3 of FIG. 2.

FIG. 4 is a section taken along lines 4—4 of FIG. 3.

FIG. 5 is an exploded isometric of a portion of the tablet dispensing mechanism of FIG. 3.

FIGS. 6 and 7 are sections taken along line 6—6 of FIG. 3.

FIG. 8 is a section taken along line 8—8 of FIG. 3.

FIGS. 9–12 are operational sketches showing various steps in the operation of a ratchet mechanism in the dispensing mechanism of FIG. 3.

DESCRIPTION OF THE PREFERRED EMBODIMENT

In FIG. 1 the reference numeral 10 indicates generally the tablet dispensing unit of the present invention. In this arrangement, the unit 10 is situated alongside a swimming pool 14 together with a pump 16 and a filter 18. To operate the dispenser, water is tapped from the pressure side of the pump 16 and directed through pipe 20 into the housing 22 of the dispenser. The water passes into an internal housing 24, past a control valve 26 and enters a pipe 28 that terminates in a jet nozzle 29. Water, jetting out of the nozzle, impinges on buckets 30 of an impeller 32. Rotation of the impeller causes actuation of a dispensing mechanism 34 which causes tablets to be dispensed one-by-one from a tubular container 36 which is secured to and projects upwardly from the housing 22. The tablets drop into a well of water in the lower part of housing 22 and are dissolved in the water which passes through a valve 38 and is drawn into a pipe 40 leading to the suction side of pump 16. A programming mechanism 35, which is primarily inside the housing 24 but has a portion extending through the top wall of housing 22, is effective to control the number of tablets which can be dispensed during a cycle of operation of the dispenser.

The dispenser housing 22, which may be made of a rigid plastic material, is a box-like structure (FIG. 2) having a curved front wall 22A and a flat top wall 22B. A platform 42 and a shallow, downwardly-opening housing 44 are mounted in fixed relation on the top wall 22B and, as seen in FIG. 3, one end of the housing 44 underlies the platform 42. The tablet container 36 extends down into a circular aperture 42A (FIG. 3) in the platform 42 and is secured, as by bonding, therein. The lower end of the container abuts the top surface of the shallow housing 44 and the inner passage of the tube is in alignment with an opening 44A in said housing so that tablets, stored in the container, can drop through the opening 44A into a recess 46A (FIGS. 4 and 5) of a pusher plate 46.

The pusher plate 46 is part of the dispensing mechanism and, as seen in FIG. 3, the plate is slidably disposed on the upper surface of the top wall 22B of the main housing 22. The plate reciprocates from left to right and back, and during this reciprocation it is guided by the side walls 44B and 44C (FIG. 4) of the shallow housing 44. The pusher plate is reciprocated by means of a disc 48, which is disposed in a circular recess 22C of the top wall of the housing and is provided with a pin 50 that projects upwardly into a slot 46B in the lower surface of the pusher plate 46. It will be evident that the pin 50 and slot 46B provide a scotch-yoke connection effecting reciprocation of the pusher plate in response to rotation of the disc 48. As the pusher plate moves to the left the tablet in the recess 46A is discharged therefrom into the upper surface 22B of the main housing. The pusher plate then moves to the right bringing its leading edge 46C into contact with the capsule to discharge the capsule into the main housing 22. After it removes a tablet from the container, the plate 46 pushes the tablet past a rubber curtain 51 which yields to allow passage of the tablet but swings back into position over the discharge opening to inhibit water and vapor from reaching the tablets in the container.

Rotation of the disc is accomplished by the impeller 32 (FIG. 3) which is driven by a jet of water issuing from the nozzle 29 which will be described presently. The impeller has buckets 30 at its periphery and a central hub 30A, that is rotatably journalled on a stationary bolt 56 threaded at its upper end (not shown) into a mounting block 58 which is, in turn, bonded to the underside of the top wall 22B of the housing. As seen in FIG. 5, the hub 30A has worm threads formed thereon for meshing with a worm wheel 59, which is journalled for rotation in the mounting block 58 and has a reduced diameter shank 59A. Worm teeth are formed on shank 59A for meshing with a worm wheel 60 which is journalled for rotation in the block 58 and is internally threaded at its upper end to receive a threaded stud 61 (FIG. 3) projecting downwardly from the disc 48. The arrangement is such that rotation of the impeller 32 causes rotation of the worms, the worm gears, and finally the disc 48.

The reciprocation of the pusher plate 46 to dispense tablets one-by-one takes place as long as the impeller is rotated by the stream of water issuing from the jet nozzle. In accordance with the present invention, the pusher plate makes a predetermined number of tablet-dispensing reciprocations per cycle and the number of reciprocations is controlled by the programming means 35 which stops the reciprocation of the pusher by deflecting the stream away from the impeller cups when the desired number of tablets has been dispensed. The parts of the programming means that detects the ejection of each tablet from the lower end of the container 36 and diverts the jet away from the buckets of the impeller are located in the previously mentioned internal housing 24 (FIG. 3). This housing comprises an upper section made up of two tubes 63A and 63B, the upper tube being secured to the underside of the top wall 22B and to a transverse circular plate 62. The lower tube 63B is secured to and depends from the plate 62. A lower section 63D is secured to the upper section by a collar 64 which is internally threaded to engage threads on the lower section.

Rigidly secured in the lower end of the section 63D is a cylindrical member 65 that defines a chamber 66 communicating with the pipe 28. A flexible rubber washer 68, secured in fixed position at the upper end of member 65, has an inner annular portion projecting into the upper end of chamber 66 to act as a seat for the beveled lower end of the valve 26. The valve 26 is secured to the lower end face of a piston 70 which has a cylindrical side wall 70A. A generally tubular flexible sleeve 72 is disposed between the outer surface of the cylindrical wall of the piston and the internal surface of the lower housing section 63D. The upper end of the sleeve is anchored between the upper end of housing section 63D and housing section 63B, while the lower end of the sleeve is anchored between the lower end of the piston and an enlarged diameter portion 26A of the valve 26. A spring 73, disposed between the lower end of the piston and the transverse plate 62, urges the valve 26 toward closed position. It will be evident that, when the valve 26 is seated on washer 68, a closed chamber 74 is formed in the lower end of the inner housing 24 and that, when water under sufficient pressure is admitted via inlet pipe 20 to the chamber, the valve will be opened, permitting water to flow into pipe 28 for delivery to the nozzle 29.

When the piston reaches a predetermined height, the upper annular edge of its cylindrical side wall engages three equispaced posts 76 (two only being shown) secured to and extending downwardly from a carrier ring 77. Continued upward movement causes a curved tubular deflector 78 to move into the path of the jet and divert it through an internal passage of the deflector. As a result, as seen in FIG. 4, the jet of water is diverted from its normal impeller-actuating path A, indicated by a phantom line, to a path B that is selected to direct the water to the space above the sump in which the tablets are discharged. As seen in FIGS. 6 and 7, the pipe 28 carrying the nozzle 29 extends through an opening in the housing section 63A, and the housing section 63A has opening 79 adapted to receive the stream of water from the nozzle and an opening 79A adapted to receive the diverted stream.

The number of tablets ejected by the pusher plate in a given dispensing cycle depends, of course, upon the amount of time it takes for the piston to lift the deflector 78 to intercept the jet stream and stop the impeller. This time interval is controlled by a program rod 80 that is slidably disposed at its upper end in a guide opening in the platform 42 and, at its lower end, is formed into a tube 80D that is slidably guided on a push rod 81 which is secured to and projects upwardly from the bottom inner surface of the piston. A relatively light spring 82, disposed between the transverse plate 62 and a flange 80A on program rod 80, urges the rod downwardly until an abutment surface 80B, formed transversely across the upper end of tube 80D, engages the upper end of rod 81. A plurality of annular slots 84 are cut at equispaced intervals in the upper portion of the rod and a plurality of ratchet teeth 85 are cut in the rod intermediate its length. As seen in FIG. 8, the ratchet teeth are not full 360° teeth but rather are cut off on opposite sides so that each tooth has two upper horizontal segmented surfaces 85A and 85B. The vertical distance between the upper surfaces of adjacent teeth 85 is the same as the distance between adjacent slots 84 on the upper end of the rod. A tapered surface 80C is formed on the rod 80 below the lowermost tooth.

Upward movement of the program rod under the urging of the piston 70 is arrested by two identical dogs 88 and 89 which are pivotally mounted by pivot pins 90 in spaced wall portions of the platform 42. The pivot point of the dog 89 is higher than the pivot point of dog 88 by an amount equal to half the distance between the upper surfaces of adjacent ratchet teeth 85. Each dog has a thrust pin 91 positioned below the pivot pin 90 and each dog is so weighted that it normally swings downwardly to the ratchet-intercepting position of dog 88 in FIG. 3. The dogs are swung outwardly from that position by means of a block 92 (FIG. 4) that is disposed between the thrust pins 91. The block is carried at the end of an actuator bar 94 which has a body portion 94A slidably disposed in a slot 95 in the shallow housing 44 and has a tab 94B projecting into a slot 96 in the pusher plate 46. The ends of the pusher plate slots are defined by abutment walls 97 and 98, respectively. In the position of FIG. 4, the pusher plate 46 has been moved to the right by the pin 50 and has ejected tablet C' and permitted tablet C' to drop into the recess on the upper surface of the plate. During this movement, the abutment wall 97 engaged the projection 94B of the actuating bar 94 and moved it to the right, causing the block 92 to engage the pin 91 of the dog 89 and swing it away from the surface 85B of the ratchet tooth which it had been overlying. This allowed the program rod to rise until the surface 85A engaged the lower edge 88A of the dog 88. It will be evident that, when the next tablet-dispensing motion of pusher 46 occurs, the pusher plate will be drawn to the left (FIG. 4) causing the abutment 98 to engage the projection 94B. As the block 92 moves toward the left, it first allows dogs 89 to swing down to move lower edge 89A into ratchet-intercepting position, and then engages thrust pin 91 of dog 88 to swing that dog to release position. Then, on the tablet-discharging stroke of the pusher plate, the dog 88 is allowed to swing into ratchet-intercepting position just prior to the dog 89 being moved to release position. It is to be noted that, since the lower edges 88A and 89A of the dogs 88 and 38 respectively are displaced a vertical distance equal to one-half the height of each ratchet tooth, the program bar will be moved upwardly in one-half tooth increments, by the pressure on the piston 70. The sequence of steps in the elevation of the program rod during one reciprocation of the pusher plate is shown diagrammatically in FIGS. 9-12.

A removable stop ring 99 (FIG. 5) is adapted to be selectively engaged in any one of the slots 84 in the program rod. This ring has a large diameter opening 99A that is larger in diameter than the outer diameter of the rod in the region of the slots, and a small diameter opening 99B (FIG. 3) adapted to snugly receive the small diameter portion of the rod at the base of each slot. To change the setting of the stop ring in the slots, the ring is moved laterally until the large diameter opening is in axial alignment with the program rod. The ring is then moved upwardly or downwardly to a position of lateral alignment with the desired slot. The ring is then moved laterally in the opposite direction to snap the reduced diameter portion of the rod in the small diameter opening in the ring. When the ring is in selected position, its lower flat surface will act as an abutment plate which engages a boss on the top of the platform 42 to limit the downward, resetting movement of the program rod after a tablet-feeding operation has been completed. Referring to FIG. 3, it will be evident that if slot No. 6 is chosen, six ratchet teeth will be below the dog 88. Similarly, if slot No. 2 is chosen, two teeth will be positioned below the dog 88 when the stop ring abuts the platform 42.

The program rod operates in the following manner. When pressurized fluid is discharged from pipe 20 into chamber 74, the piston 70 is raised against the action of spring 73 causing the upper end of rod 81 to engage the abutment surface 80B of the tube 80D and start the upward movement of the rod. As the piston starts upwardly, valve 26 is raised off its seat, permitting fluid to flow through conduit 28 to the nozzle 29 for discharge against the impeller buckets. As the impeller moves the pusher plate back and forth to dispense tablets, the dogs 88 and 89 are actuated to allow the program rod to move upwardly in increments of one-half tooth height. When the lowermost tooth has passed the dog 89, the tapered surface 80C engages the dogs and pivots them outwardly, allowing unrestrained upward movement of the program rod and the piston. Shortly after the lowermost tooth passes the dog 89, the upper edge of the piston engages the three downwardly projecting legs 76 of the water-diverting mechanism. Further upward movement of the piston effects interception of the water stream by the deflector 78 and diversion of the stream to path B (FIG. 7). When the pump is turned off and the pressure below piston 70 disappears, the spring 73 urges the piston downwardly to seat the valve 26.

The valve 38 (FIG. 3) which controls the flow of treated water from the unit and prevents backflow of water into the unit comprises a valve body 100 which has a hollow inner chamber 101, a side opening 102 communicating with the pipe 40, and a tapered top opening 103 which has an O-ring 105 disposed therein. The upper portion of opening 103 is cut away so that a tapered valve member 106, carried on float 107, can move into contact with the O-ring when the water level in the housing drops below a predetermined height. When the water level rises, the float moves the tapered valve 106 away from the O-ring to allow treated water to flow through the valve into conduit 40. When, during elevation, the float reaches a second predetermined height, it moves an annular rubber valve member 108 into contact with the tapered inner side 100A of the valve body 100. Thus the valve opens and closes, responsive to the level of treated liquid in the housing 22.

It will be noted that the closing of valve 38, caused by rising of the water level in housing 22 and subsequent engagement of the valve member 108 with the tapered surface 100A of valve body 100, prevents backflow from conduit 40 into the unit. Similarly loss of pressure in chamber 66 allows spring 73 to close valve 26 closing off conduit 20. Thus the unit may be located safely above or below the water level of the pool which it serves since the free water surface, which it contains, is sealed from the pool plumbing whenever the pump is stopped. Thus neither loss of pool water, nor loss of pump prime, can occur through the unit.

As the preceding description shows, the program rod is "armed" whenever a loss of pressure due to pump shutoff occurs. The selected number of tablets required for proper pool chlorination are then sequentially discharged whenever the pump is restarted. When this number is reached, the action energizing jet is deflected and the unit waits in an "at rest" position until another pump shutoff signals a new cycle of operation.

Having thus described our invention, what we claim as new and desire to protect by Letters Patent is:

1. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a quantity of tablets, means for dispensing tablets from said container into said reservoir for dissolving therein, programming means controlling the actuation of said dispensing means to selectively control the number of tablets dispensed during an operating cycle, and means for varying the number of tablets discharged by said dispensing means during each cycle.

2. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a stack of tablets, means for dispensing tablets from said container into said reservoir for dissolving therein, and programming means controlling the actuation of said dispensing means to selectively control the number of tablets dispensed, said dispensing mechanism including a power-driven reciprocatory pusher movable across the lower end of the stack to separate the lowermost tablet from the stack.

3. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a quantity of tablets, means for dispensing tablets from said container into said reservoir for dissolving therein, programming means controlling the actuation of said dispensing means to selectively control the number of tablets dispensed, a drive mechanism attached in driving relation with said dispensing mechanism, and water pressure actuated means for energizing said drive mechanism and for energizing said programming means.

4. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a quantity of tablets, means for dispensing tablets from said container into said reservoir for dissolving therein, and programming means controlling the actuation of said dispensing means to selectively control the number of tablets dispensed, an impeller unit connected to said dispensing means for actuating the same, means for directing a jet of fluid against said impeller to rotate it, and means for interrupting the flow of fluid from said jet after a predetermined number of actuations of said dispensing means.

5. In a system for treatment of liquid in a pool, said system having a pump means arranged to withdraw liquid from the pool and deliver it back to the pool, a relatively small auxiliary tank adjacent said pool, the improvement which comprises a tablet dispensing mechanism arranged to operate through a cycle to discharge at least one tablet into said auxiliary tank, means responsive to the pressure of liquid being pumped to energize said dispensing mechanism, and programming means for controlling the number of tablets dispensed by said mechanism during each cycle.

6. In a system for treatment of liquid in a pool, said system having a pump means arranged to withdraw liquid from the pool and deliver it back to the pool, the improvment which comprises a relatively small auxiliary tank adjacent said pool, a dispensing mechanism arranged to operate through a cycle to discharge at least one tablet into said auxiliary tank, means responsive to the pressure of liquid being pumped by said pump means to energize said dispensing mechanism, programming means for controlling the number of tablets dispensed by said mechanism during each cycle including a control member operably associated with said dispensing mechanism and movable in a first direction away from a starting position and toward a dispensing-restricting position under the pressure of said liquid during the actuation of said dispensing mechanism and movable in a return direction toward said starting position when the pressure of the pumped liquid is decreased, said programming means including a mechanism for stopping the actuation of said dispensing mechanism when said movable member reaches said restricting position during continued operation of said pump means.

7. In a system for treatment of liquid in a pool, said system having pump means arranged to withdraw liquid from the pool and deliver it back to the pool, the improvement which comprises a relatively small auxiliary tank adjacent said pool, a tablet dispensing mechanism arranged to operate through a cycle to discharge at least one tablet from a stack of tablets into said auxiliary tank, means responsive to the pressure of liquid being pumped by said pump means to energize said dispensing mechanism and responsive to the stopping of said pump means to reset the dispensing mechanism for a new dispensing cycle.

8. A system according to claim 7 including programming means for controlling the number of tablets dispensed by said mechanism during each cycle.

9. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a quantity of tablets, means for dispensing tablets from said container into said reservoir for dissolving therein, and programming means controlling the actuation of said dispensing means to selectively control the number of tablets dispensed, said programming means including a ratchet rod, and said dispensing means including an escapement mechanism associated with said rod to limit movement thereof to predetermined increments of movement.

10. A mechanism according to claim 9 further comprising water pressure means for actuating said dispensing means and for urging said rod through said predetermined increments of movement.

11. A mechanism according to claim 10 wherein said water pressure means includes an impeller unit connected to said dispensing mechanism, conduit means for directing a jet of water against said impeller unit, means defining a pressure chamber, a piston in said chamber connected to said ratchet rod, and a hydraulic pressure line connected to said chamber and to said conduit for directing a jet against said impeller and exerting pressure on said piston.

12. In a system for treating liquid in a pool having pump means for drawing liquid from the pool and returning it to the pool, means providing a reservoir of liquid adjacent said pool, means for directing liquid from said reservoir to said pump for passage through the system, the improvement which comprises a container for retaining a quantity of tablets, means for dispensing tablets from said container into said reservoir for dissolving therein, and programming means controlling the actuation of said dispensing means to selectively control the number of tablets dispensed, said programming means including a ratchet rod movable through a predetermined distance incident to the dispensing of each tablet, and control means associated with said programming means and said dispensing means for arresting the movement of said ratchet rod when a selected number of tablets have been dispensed.

13. A mechanism according to claim 12 further characterized by liquid pressure means urging said ratchet rod to move through said predetermined distance, and an escapement mechanism actuated by said dispensing mechanism for alternately releasing and arresting said ratchet rod to limit movement thereof to said predetermined distance during the dispensing of a single tablet.

14. A mechanism according to claim 1 wherein said control means comprises means guiding said rod for movement in an axial direction and wherein said programming means includes an escapement mechanism actuated by said dispensing means and engageable with the teeth on said rod to limit upward movement of said rod, a programming member engageable with said rod at various stations thereon and being effective when selectively engaged at each station to position a different number of ratchet rod teeth below said escapement mechanism, and pressure means for urging said ratchet rod upwardly to respond to the action of said escapement mechanism.

15. A mechanism according to claim 14 further characterized by means responsive to said pressure means for actuating said dispensing means.

* * * * *